United States Patent [19]

St. Clair

[11] 3,813,916

[45] June 4, 1974

[54] METER PROVING SYSTEM

[75] Inventor: Theodore A. St. Clair, Fairfield, Conn.

[73] Assignee: Textron Inc., Providence, R.I.

[22] Filed: Mar. 19, 1973

[21] Appl. No.: 342,832

[52] U.S. Cl. ................................... 73/3
[51] Int. Cl. ............................. G01f 25/00
[58] Field of Search .................... 73/3, 149

[56] References Cited
UNITED STATES PATENTS 2,039,506  5/1936  Wagner et al. .................... 73/3
3,475,949  11/1969  Truhan ............................. 73/3

Primary Examiner—Donald O. Woodiel
Attorney, Agent, or Firm—Arthur A. Johnson

[57] ABSTRACT

There is disclosed a method and apparatus for proving fluid meters, such as gas meters, having index means wherein a pair of cylindrical tanks each of which is half filled with proving oil has a connecting conduit between them near their bottom ends to achieve an initial common oil level, a float in one of said tanks being connected by a cable which passes over and operates an optical encoder indicates the rise and fall of the oil level in the tanks in terms of volume displaced. The cable passing over the encoder has a weight to counterbalance that of the float. One of the tanks is connected to the outlet opening of the meter to be tested while the inlet thereof is open to the atmosphere. The air in one of said tanks being removed by suction causes the test oil level to drop in the tank connected to the meter and thereby causes air to be drawn through the meter. When either the encoder or the index reaches a determinate reading, the operation is stopped and the encoder and index are compared to determine the proof of the meter.

11 Claims, 2 Drawing Figures

METER PROVING SYSTEM

This invention relates to methods and means for proving fluid meters of the positive displacement, diaphragm-operated type.

An object of this invention is to provide an improved meter proving system which is particularly useful in proving fluid meters such as positive displacement, diaphragm-operated gas meters, said apparatus being accurate, requiring a minimum amount of test air and being rapidly completed whereby the variations in ambient temperature of the air during the proving is inconsequential.

Another object is to prove a meter with simple, readily accessible equipment.

A further object is to provide apparatus whereby the meter may be proved either by a dynamic method or a static method.

These and other objects hereinafter appearing have been attained by providing two bottom-connected cylindrical tanks or cylinders each approximately half filled with proving oil, one cylinder being connected to a meter to be proved by conduit means including an orifice for controlling the rate of flow of test air drawn into the first cylinder from the meter being tested, and the second cylinder being connected to a source of suction which causes the oil level therein to rise and oil to flow from the first cylinder to the second cylinder in which a counterbalance float rises as the flow proceeds, the float being connected to an encoder calibrated to indicate the volume of test air which flowed through the meter, the reading of the encoder being compared with the index on the meter being proved, the negative pressure of the vacuum being controlled by a differential controller.

If it is desired to prove a meter by the static method, the proper amount of vacuum is applied to the tank containing the float to evacuate air from that tank lowering the level of the test oil in the first tank which results in drawing a determined quantity of air through the meter. The displacement is continuous until the prover hand on the meter index reaches a determinate stop position whereupon the reading of the encoder compared with the reading on the meter index establishes the accuracy or the degree of inaccuracy of the meter index.

Other features and advantages will hereinafter appear.

Figure 1:
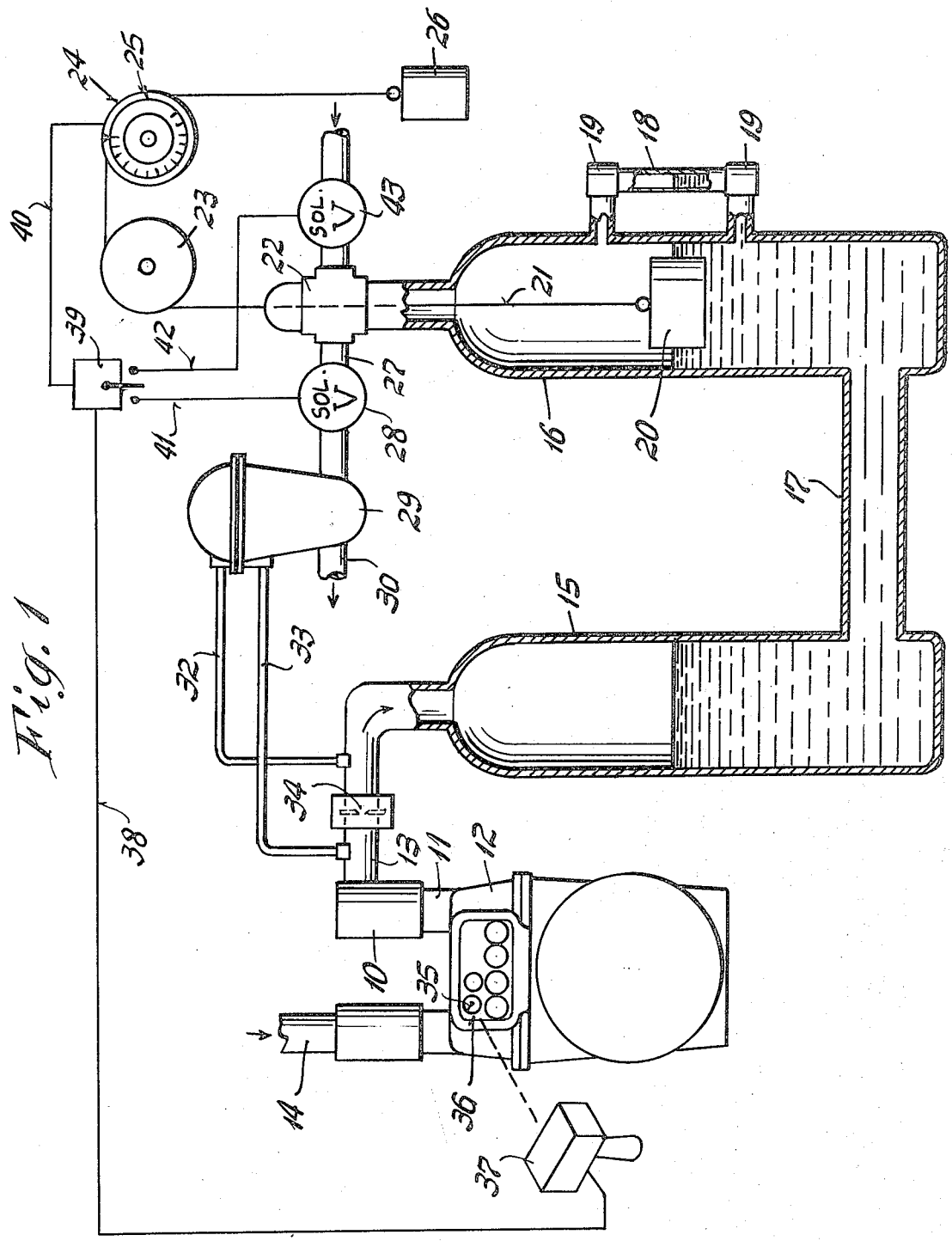
FIG. 1 is a schematic diagram of the various components of the prover apparatus of this invention.

As shown in the accompanying drawings the apparatus employed, according to the present invention, for proving the accuracy of a positive displacement, diaphragm-operated fluid meter comprises an attachment fitting 10 for connecting an outlet 11 of a meter 12 to a conduit 13 to receive test air entering the meter through an inlet 14 thereof.

The prover apparatus of the present invention comprises two bottle-like hollow tanks or cylinders 15 and 16 having a connecting conduit 17 extending between them near their bottom ends on which they stand upright.

Both tanks 15 and 16 are partially filled with liquid, such as test oil, with the level of the liquid being observable through a glass gauge 18 mounted in brackets 19 and in communication with the liquid in the tank 16.

Normally, i.e. in idle condition, air in the tanks 15 and 16 is under atmospheric pressure so that the levels of test oil in the tanks are equal, the level of the oil being indicated by observing the level of oil in the glass gauge 18. The level of the oil in the tank 16 is also determined by the position of the float 20 resting on the surface of the oil in the tank. The float 20 is connected by a cable or cord 21 which passes through a fitting 22 in the top of the tank 16 which has close but very low friction clearance with the cable 21 to minimize air leakage. If a slight leak should develop at this point, it can be tolerated as the vacuum source has ample capacity and the differential pressure controller will compensate for it. From the fitting 22 the cable 21 passes over an idler pulley 23 to a pulley 24 of a visual rotary encoder 25 and from the latter to a weight 26 which counterbalances the weight of the float 20.

The fitting 22 on the top of the tank 16 has a branch 27 having a solenoid valve 28 and a differential controller 29 connected to a conduit 30 which is connected to a vacuum source, not shown.

Before the proving operation is begun, the meter 12 is connected to the apparatus by the pneumatic actuated connection 10 with the prover at equilibrium, that is with the valve 28 closed and the encoder 25 set to a non-counting state. The proving operation is started at a prescribed flow rate by opening the valve 28 and applying vacuum to line 30. This causes air to be exhausted from the tank 16 which causes the level of the oil therein to rise and the level of the oil in the tank 15 to fall, thereby creating suction which draws air through the line 13, connection 10 and outlet 11 from the meter 12. The flow rate of the test air to the tank 15 is controlled by the differential pressure controller 29 which is connected by conduits 32 and 33 to opposite sides of an orifice 34 in the line 13 leading from the meter 12 to the tank 15.

The rise in the level of oil in the tank 16 causes the float 20 to rise. When a prover hand 35 on the meter index 36 reaches a starting position, encoder 25 starts counting and when the index hand reaches a predetermined stop point, encoder 25 is signaled to stop counting. The count on the encoder is compared to the meter index to determine proof of the accuracy of the meter in the accepted manner.

The index 36, according to this invention, may be read visually or by an electric eye apparatus 37 which can provide the signal for starting and stopping the counting operation of the encoder. For this purpose a circuit 38 from the electric eye 37 to a solenoid switch 39 is connected by lead 40 to the encoder 25 to start and stop the latter, while a lead 41 connected to the solenoid closes the latter and a lead 42 causes the opening of the solenoid valve 43 leading to the atmosphere to permit the apparatus to equalize and prepare the prover for the next proving operation.

In the static method of proving a meter with the use of the apparatus disclosed, after the connection 11 is applied to the outlet of the meter 12, the counterweight 26 is adjusted to balance the weight of the float 20 to obtain a zero reading on the encoder when the prover hand 35 is at starting position. Initially the solenoid valves 28 and 43 are closed.

When a proof run is to be made, the proper amount of vacuum is applied to the line 30 and solenoid valve 28 is opened causing air to be evacuated from tank 16. This will cause the test oil level in the tank 16 to rise and the test oil level in the tank 15 to fall creating a partial vacuum which results in air at atmospheric pressure to be drawn through the meter and into the tank 15 at a rate of flow controlled by the orifice 34 and differential pressure controller 31.

The proving operation is continued until the prover hand 35 on the index reaches the stop position. After valve 28 is instantaneously closed by the electric eye 37 and the solenoid switch 39 operated, the volume of test air used is indicated by the meter index 35 being compared with the volume indicated on the encoder 25.

Instead of interrupting the proving operation by means of the electric eye 37, the operator may optically view the encoder 25 and stop the operation at any desired volume showing and compare it with the position of the prover hand on the meter index.

After the proof run is completed, the valve 43 is opened to refill the system with air and balance the liquid levels in the tanks 15 and 16.

The time required to complete the proving of a meter is limited only by the time required for the prover hand to move from starting to stopping positions, depending on the volume of fluid considered to constitute a satisfactory proving, there being no need for utilizing the entire volume of air available in the tanks 15 and 16.

Figure 2:
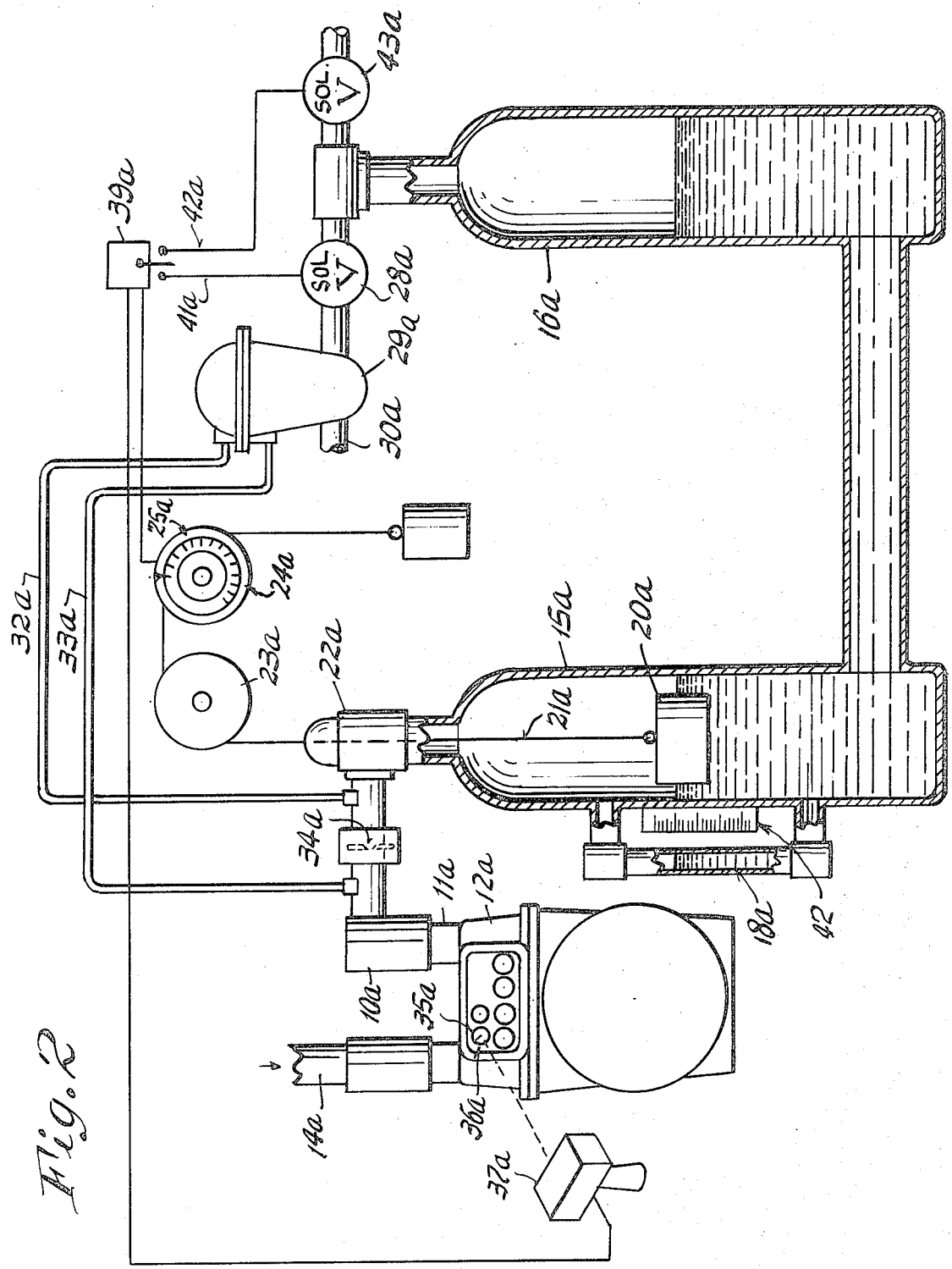
FIG. 2 is a view similar to FIG. 1, but showing a modified form of the invention.

In the broader aspects of this invention either one of the tanks 15 or 16 may contain the float connected to the encoder. For instance, as shown in FIG. 2, the float 20a may be located in the tank 15a and its cable 21a may be passed over the pulley 23a and the encoder 25a, the end of the cable 21a being attached to the weight 26a.

The tank 16a is connected to a source of vacuum by conduit 30a and valve 28a and to the atmosphere by valve 43a as is in the arrangement shown in FIG. 1. Likewise, the differential pressure controller 31a with its lines 32a and 33a control the pressure on opposite sides of the orifice 34a, the same as in the form of the invention shown in FIG. 1.

When recording a proving run, the operations are the same as with the apparatus shown in FIG. 1, except that the float 20a is located in the tank 15a and the cable 21 extends through the fitting 22a which is on the tank 15a. Suction applied to the top of the tank 16 results in raising the level of the proving oil in tank 15 and the lowering of the level of the proving oil in tank 16 resulting in air being drawn through the meter.

If desired, the tank 15a may have a transparent fluid level 18a and a scale 42 by which the displacement of test fluid may be determined.

In FIG. 2 parts which correspond to parts shown in FIG. 1 have the same reference numbers with the letter a added.

Variations and modifications may be made within the scope of the claims and portions of the improvements may be used without others.

I claim:

1. Apparatus for proving a positive displacement, diaphragm-operated gas meter having index means indicating the volume of fluid passing through the meter, said apparatus comprising a pair of upstanding elongate tanks adapted to be partially filled with test liquid; conduit means connecting said tanks and initially maintaining the liquid level the same in both tanks, a first of said tanks having conduit means connectible to the outlet of a fluid meter and the second of said tanks having conduit means connectible to means for creating a partial vacuum in said second tank to cause the level of the liquid in said second tank to rise and resulting in the level of the liquid in the first tank to fall whereby air at atmospheric pressure is drawn into and through the meter and thereby operates the indexing means of the meter; and encoder means responsive to the extent of the fall of the level of liquid in the first tank and the rise of liquid level in said second tank for indicating the actual volume of gas which flowed through the meter for comparison with the volume indicated by the index of the meter.

2. Apparatus as defined in claim 1 in which said means for indicating the extent of the rise and fall of the liquid in said tanks comprises buoyant means floating at the surface of the liquid in said one of the tanks and means connecting said buoyant means to said encoder.

3. Apparatus as defined in claim 2 in which the buoyant means comprising a float and the connecting means includes a cable connected to the float and to the encoder.

4. Apparatus as defined in claim 3 in which the encoder and the index means have optically readable, volume-indicating means.

5. Apparatus as defined in claim 1 in which the conduit means between the first tank and the meter include means for maintaining constant the pressure of the air entering into said first tank.

6. Apparatus as defined in claim 5 in which the means for maintaining the pressure of the air entering said first tank comprises an orifice in said conduit means between said meter and said first tank, and a differential pressure controller.

7. Apparatus as defined in claim 1 in which there are start and stop means including the valve means between said second tank and said means for creating a partial vacuum in said first tank to operate to start and stop the proving operation.

8. Apparatus as defined in claim 7 in which the meter has optical proving means and there are light-responsive means cooperating with said optical proving means for controlling the operation of said start and stop means.

9. Apparatus as defined in claim 1 in which said encoder means includes a buoyant member supported on the test liquid in said first tank.

10. Apparatus as defined in claim 1 in which said encoder means includes a buoyant member supported on the test liquid in said second tank.

11. The method for proving a positive displacement, diaphragm-operated gas meter having index means indicating the volume of gas passing through the meter including the steps of providing a first tank and a second tank, partially filling said tanks with test liquid, connecting the tanks together to initially maintain the same level of liquid, connecting said first tank to the outlet of the meter to be proved, withdrawing air from said second tank thereby causing the level of the liquid in the second tank to rise and that of the first tank to fall exposing the inlet of the meter to the atmosphere to cause atmospheric air flow through the meter into the first tank, reading the amount of change in the liquid level of one of the tanks in terms of volume, and comparing said reading with the index of the meter.

* * * * *